(12) United States Patent
Leung

(10) Patent No.: US 9,290,044 B2
(45) Date of Patent: Mar. 22, 2016

(54) OIL HUB CAP

(71) Applicant: Arthur Leung, Mississauga (CA)

(72) Inventor: Arthur Leung, Mississauga (CA)

(73) Assignee: Cimmaster Inc., Mississauga, ON (CA)

( * ) Notice: Subject to any disclaimer, the term of this patent is extended or adjusted under 35 U.S.C. 154(b) by 356 days.

(21) Appl. No.: 13/690,127

(22) Filed: Nov. 30, 2012

(65) Prior Publication Data

US 2014/0152081 A1 Jun. 5, 2014

(51) Int. Cl.
*B60B 7/00* (2006.01)
*B60B 27/00* (2006.01)

(52) U.S. Cl.
CPC .............. *B60B 7/002* (2013.01); *B60B 7/0013* (2013.01); *B60B 7/0033* (2013.01); *B60B 27/0073* (2013.01); *B60B 2900/113* (2013.01)

(58) Field of Classification Search
CPC .... B60B 7/0013; B60B 7/002; B60B 7/0073; B60B 2900/531; B60B 2900/561; B60B 2900/571
USPC ........... 301/108.1, 108.2, 108.3, 108.4, 108.5
See application file for complete search history.

(56) References Cited

U.S. PATENT DOCUMENTS

| | | | | |
|---|---|---|---|---|
| 1,068,626 | A * | 7/1913 | Buck | 73/334 |
| 2,301,460 | A * | 11/1942 | Sauer | 73/327 |
| 3,064,982 | A * | 11/1962 | Stephens | 277/402 |
| 3,089,738 | A * | 5/1963 | Charles | 384/473 |
| 3,150,524 | A * | 9/1964 | Arens | 73/747 |
| 3,395,950 | A * | 8/1968 | Brandt | 384/148 |
| 4,073,540 | A * | 2/1978 | Jackowski | 301/108.3 |
| 5,024,488 | A * | 6/1991 | Lindhuber et al. | 301/108.4 |
| 5,205,617 | A * | 4/1993 | Hoffmann | 301/108.1 |
| 5,752,746 | A * | 5/1998 | Perry | 301/108.1 |
| 6,273,519 | B1 | 8/2001 | Tsou | |
| 6,289,726 | B1 * | 9/2001 | Ferris et al. | 73/114.38 |
| 6,447,072 | B1 * | 9/2002 | Johnson | 301/108.2 |
| 6,575,028 | B2 * | 6/2003 | Colussi et al. | 73/323 |
| 6,983,999 | B2 * | 1/2006 | Goettker | 301/108.4 |
| 8,893,855 | B2 * | 11/2014 | Sharp et al. | 184/5.1 |
| 2002/0124648 | A1 * | 9/2002 | Colussi et al. | 73/323 |

OTHER PUBLICATIONS

Commercial Vehicle Tech Tips: Proper Lubrication Procedures for Wheel Ends. (2014). Retrieved Sep. 15, 2015, http://www.timken.com/EN-US/solutions/automotive/aftermarket.
The Dangers of Overgreasing. (Nov. 2011). Retrieved Sep. 15, 2015, from http://www.machinerylubrication.com/Articles/Print/28664.
Bearing Failure Due to Over Lubrication. (2014). Retrieved Sep. 15, 2015, from http://www.belray.com/print/27623.

* cited by examiner

*Primary Examiner* — Kip T Kotter

(57) ABSTRACT

The present invention is directed to an oil hub cap comprising a cylindrical body for mounting to a wheel axle defining an interior space for holding lubricant oil and a transparent front face. An indicating ring is located within the interior space, such that the outside edge of the indicating ring indicates the minimum amount of lubricant to be contained within the interior space and the inside edge of the indicating ring indicates the maximum amount of lubricant to be contained within the interior space, the surface of the indicating ring between the inside and outside edges being provided with a reflective surface.

6 Claims, 4 Drawing Sheets

OIL HUB CAP

FIELD OF THE INVENTION

The present invention relates to a hub structure of a vehicle wheel axle. In particular, the invention relates to an oil hub cap of a wheel spindle which allows for the rapid determination of the amount of lubrication contained in the oil hub cap for lubricating the wheel bearings in the spindle of the axle.

BACKGROUND OF THE INVENTION

Vehicle wheels are generally mounted to the chassis of the vehicle by an axle and a suitable lubricant such as grease or lubrication oil is commonly applied between the hub of the wheel and the spindle of the axle to allow the wheel to rotate about the spindle when the vehicle is in motion. Oil hub caps are commonly employed in large commercial vehicles such as large commercial trucks and trailers. The oil hub cap within the interior contains lubricating oil to provide the lubrication between the wheel hub and the spindle. It is common to provide for a visual inspection means at the front of the oil hub cap to allow a user to visually check the amount of the lubricant in the cap. In prior art embodiments, the casing of the oil hub cap is covered by a clear window and the surface of the window is etched with two concentric circles indicating a full level of lubricant within the oil hub cap or that the level of lubricant must be replenished. Examples of such oil hub caps are shown in U.S. Pat. Nos. 5,752,746; 6,273,519 and 6,447,072 among others.

While such prior art arrangements do allow for visual inspection, it can be difficult in some circumstances to clearly view the lubricant level within the oil hub cap. This is particularly the case if the lubricant level is being checked at inadequate light level where it may be difficult to be able to clearly see the levels even with the use of a flashlight as the flashlight may either reflect off the surface of the window obscuring the fluid level or if the fluid has been recently changed, the colour being a lighter colour may be difficult to observe through the window.

There thus remains a need to allow for easy determination of the fluid levels within an oil hub cap under any conditions.

SUMMARY OF THE INVENTION

The present invention is directed to an oil hub cap comprising a cylindrical housing for mounting to a wheel hub defining an interior space for holding lubricant oil and a transparent front face. An indicating ring is located within the interior space, such that the outside edge of the indicating ring indicates the minimum amount of lubricant to be contained within the interior space and the inside edge of the indicating ring indicates the maximum amount of lubricant to be contained within the interior space, the surface of the indicating ring between the inside and outside edges being provided with a reflective surface.

In an aspect of the invention, the indicating ring is mounted on an annular plate extending from the side of the cylindrical housing inwardly into the interior space, the annular plate between the side wall of the cylindrical housing and the indicating ring being provided with a number of openings to allow for the flow of the lubricating fluid from one side of the annular plate to the other within the interior space.

In another aspect of the invention, the transparent front face is a transparent annular window having a central opening aligning with the central opening of the annular plate and a stopper is provided to seal the aligned central openings of the transparent annular window and annular plate.

In a further aspect of the invention, the annular plate is provided to the interior of the indicating ring with a sealing ring to provide for the seat for the transparent annular window and the stopper.

In yet another aspect of the invention, the sealing ring comprises a side wall extending upwardly from the annular plate at an obtuse angle to a ledge in line with a ledge encircling an inner wall of the cylindrical housing to seat the transparent window thereon. Each of the ledges being provided with a groove to allow for a sealing gasket to seal the lower surface of the transparent window. The inner edge of the sealing ring is provided with a camming surface sloping downwardly and inwardly to allow the stopper to be inserted into the opening and the sealing ring is provided with an undercut below the camming surface to provide a seating surface to engage the sealing portion of the lower edge of the stopper to seal the opening in the front face of the oil hub cap.

BRIEF DESCRIPTION OF THE DRAWINGS

Preferred embodiments of the present invention are illustrated in the attached drawings in which.

DETAILED DESCRIPTION OF THE PREFERRED EMBODIMENTS

Figure 1:
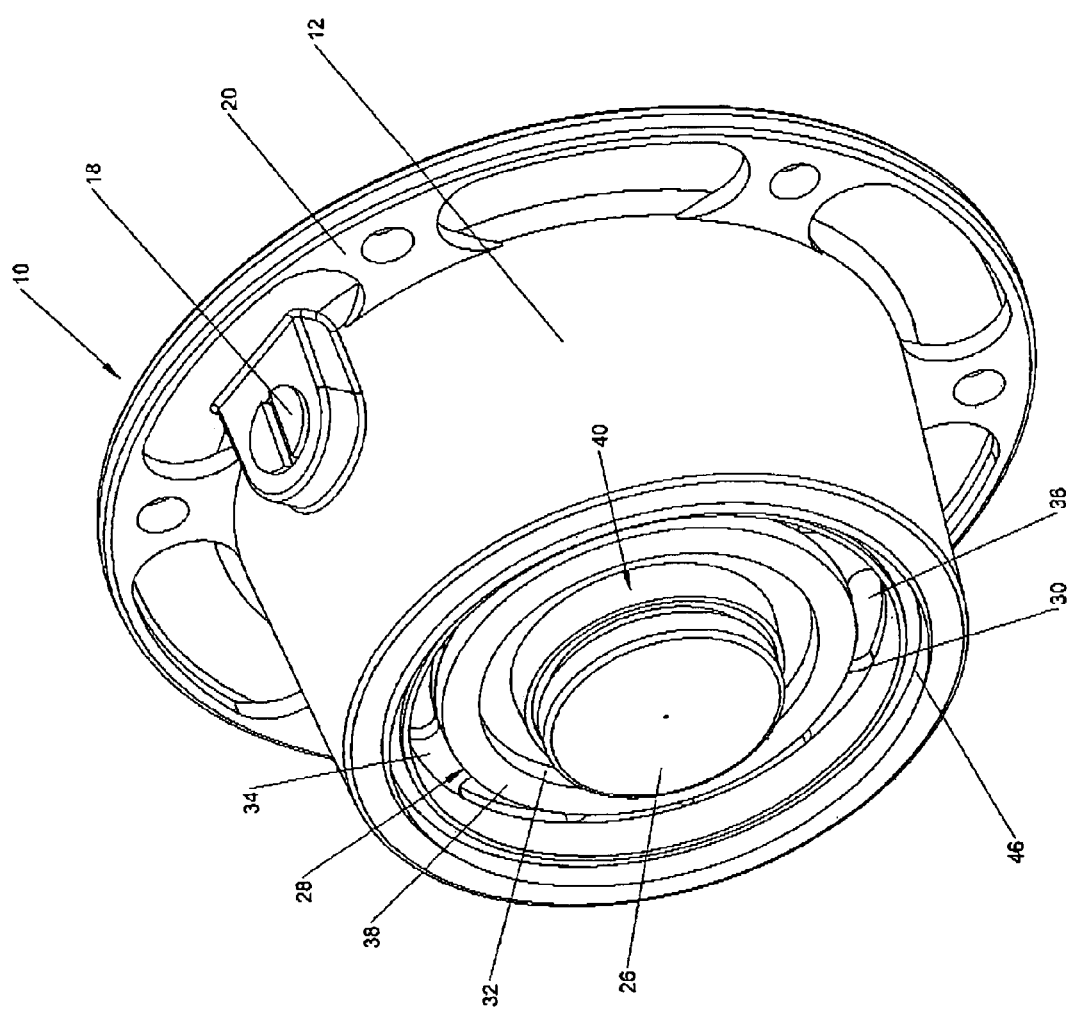
FIG. 1 is a perspective view of an oil hub cap of the present invention.
Figure 2:
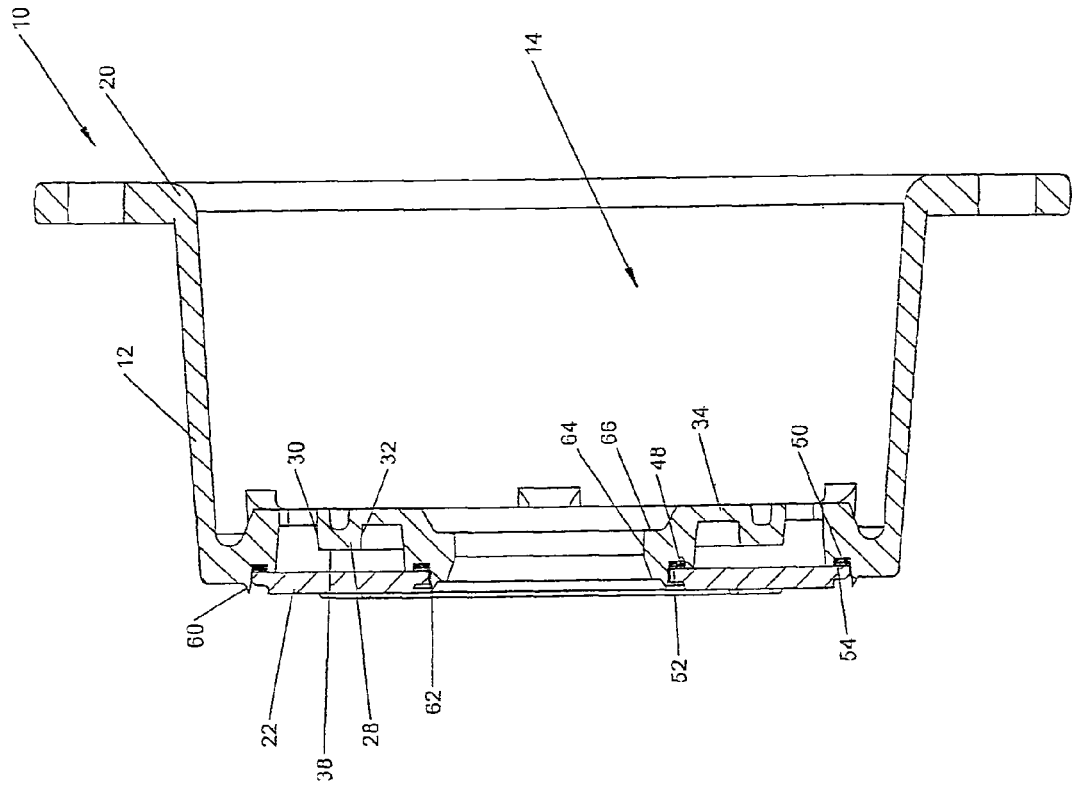
FIG. 2 is a side elevation view in cross section of the oil hub cap of FIG. 1 showing the placement of the transparent window.
Figure 3:
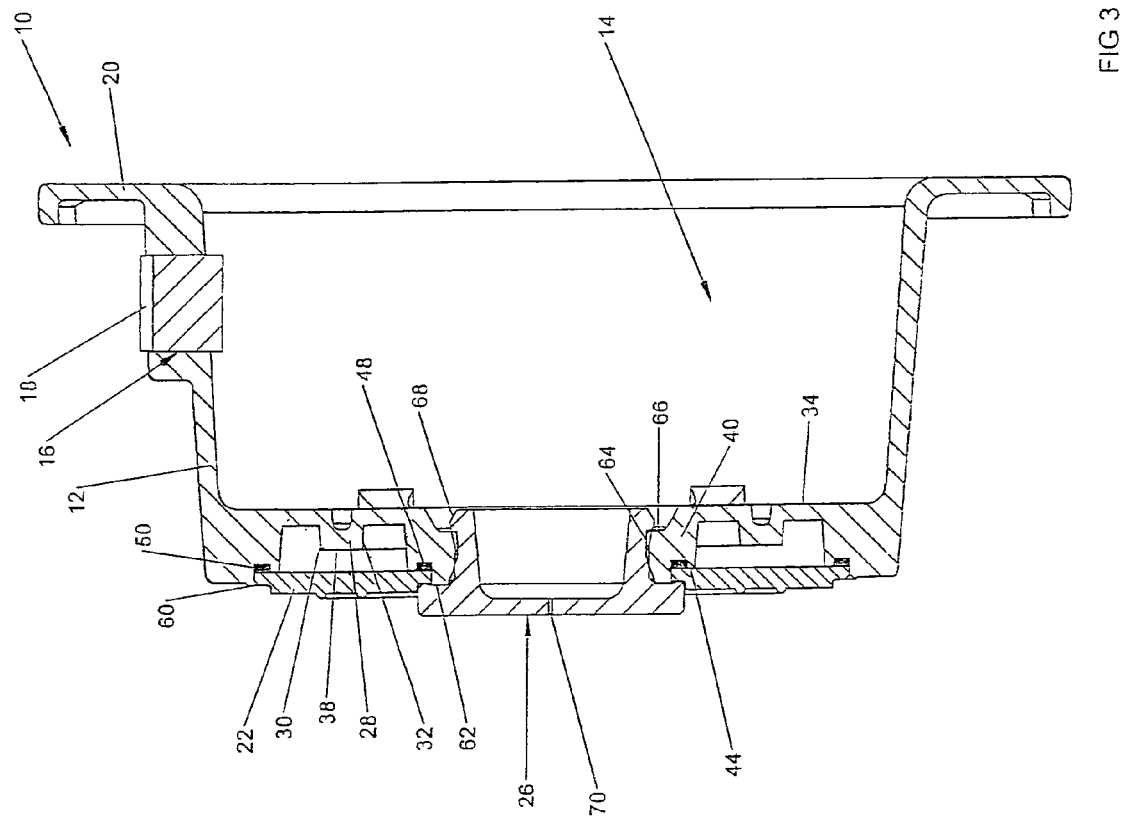
FIG. 3 is a side elevation view in cross section of the oil hub cap of FIG. 1 showing the attachment of the window and the stopper.

The present invention is directed to an oil hub cap of a wheel hub which allows for the rapid determination of the amount of lubrication contained in the oil hub cap for lubricating the bearings on the spindle of the wheel. A preferred embodiment of an oil hub cap according to the present invention is shown in the figures generally indicated by the numeral 10. Oil hub cap 10 has a cylindrical housing 12 defining an interior space 14 for holding lubricant, preferably lubricating oil. An oil fill hole 16 is provided in the cylindrical housing 12 to enable the lubricating oil to be placed within the interior space 14. The oil fill hole 16 is sealed with a stopper 18, preferably a threaded stopper which has exterior threads that mate with interior threads provided on the wall of the oil fill hole 16.

The oil hub cap 10 is provided with a mounting flange 20 at the back face of the cylindrical housing 12 to enable the oil hub cap 10 to be mounted on the wheel hub as will be explained further below. The front face of the oil hub cap 10 is provided with a transparent window 22 used to seal and close off the front face of the oil hub cap 10. The means for attaching the transparent window 22 to the oil hub cap 10 may be any of those common in the art such as a ring attached to the front face and sandwiching the transparent window and a sealing gasket between the ring and the front face. Preferably, the transparent window 22 has an annular ring shape with a central opening 24 and the central opening 24 is sealed by a stopper 26 which is inserted within a central opening in the front face of the oil hub cap 10 as will be explained further below.

The oil hub cap 10 is provided with an indicating ring 28 located within the interior space 14 with the outside edge 30 of the indicating ring 28 indicating the minimum amount of the lubricant to be contained within the interior space 14 and the inside edge 32 of the indicating ring 28 indicating the maximum amount of lubricant to be contained within the interior space 14. This indicating ring 28 may be mounted within the interior space 14 by a series of tabs extending from the inner wall of the cylindrical housing 12 to hold the indicating ring 28. Openings are provided between the tabs to allow for the flow of the lubricating fluid within the entirety of the interior space 14 of the oil hub cap 10.

Preferably, as illustrated in the figures, the indicating ring 28 is mounted on an annular plate 34 extending from the inner side of the cylindrical housing 12 inwardly into the interior space 14. The annular plate 34 between the side wall of the cylindrical housing 12 and the indicating ring 28 is provided with a number of openings 36 to allow for the flow of the lubricating fluid from one side of the annular plate 34 to the other within the interior space 14. The indicating ring 28 is mounted on the surface of the annular plate 34 spaced away from the side wall of the cylindrical housing 12 such that the outside edge 30 of the indicating ring 28 indicates the minimum amount of lubricant contained within the interior space 14 and the indicating ring 28 is of a width such that the inside edge 32 of the indicating ring 28 indicates the maximum amount of lubricant to be contained within the interior space 14. The surface 38 of the indicating ring 28 between the two edges 30 and 32 is provided with a reflective surface such that a light shining on the surface 38 is reflected back toward the light. This reflective surface may be provided by machining or polishing the surface 38 of the indicating ring 28 to a light or mirror like finish. Alternatively, the reflective surface may be provided by a reflective oil resistant paint provided on the surface 38 of the indicating ring 28.

The annular plate 34 is provided to the interior of the indicating ring 28 with a structure such as a sealing ring 40 to provide for the seat for the transparent window 22 and the stopper 26. From the annular plate 34 a side wall 42 extends outwardly at an obtuse angle to a ledge 44 in line with a ledge 46 encircling the inner wall of the cylindrical housing 12 to seat the transparent window 22 thereon. Each of the ledges 44 and 46 are provided with grooves 48 and 50 respectively to accept sealing gaskets 52 and 54 to seal the lower surface of the transparent window 22 as it rests thereon. The inner wall of the cylindrical housing 12 above the ledge 46 and the wall of the sealing ring 40 above the ledge 44 extend upwardly to a top surface 56 and 58 at a height from the ledges 46 and 44 equal to the thickness of the transparent window 22. The top surface 56 of the wall of the cylindrical housing 12 and the top surface 58 of the wall of the sealing ring 40 are provided with an extension ring 60 and 62 encircling the walls extending above the top surfaces 56 and 58 and having a triangular cross section. The triangular cross section extension rings 60 and 62 are capable of being pressed or rolled to overlie the transparent window 22 to hold the transparent window 22 securely and sealed on the front face of the oil hub cap 10.

The inner edge of the sealing ring 40 is provided with a camming surface 64 sloping downwardly and inwardly to allow the stopper 26 to be inserted into the opening and the sealing ring 40 is provided with an undercut 66 to provide a seating surface to engage the sealing portion 68 of the lower edge of the stopper 26 to seal the opening in the front face of the oil hub cap 10. The stopper 26 may be provided with a central air vent hole 70 to allow the pressure within the oil hub cap 10 to equalize with the exterior atmosphere.

Figure 4:
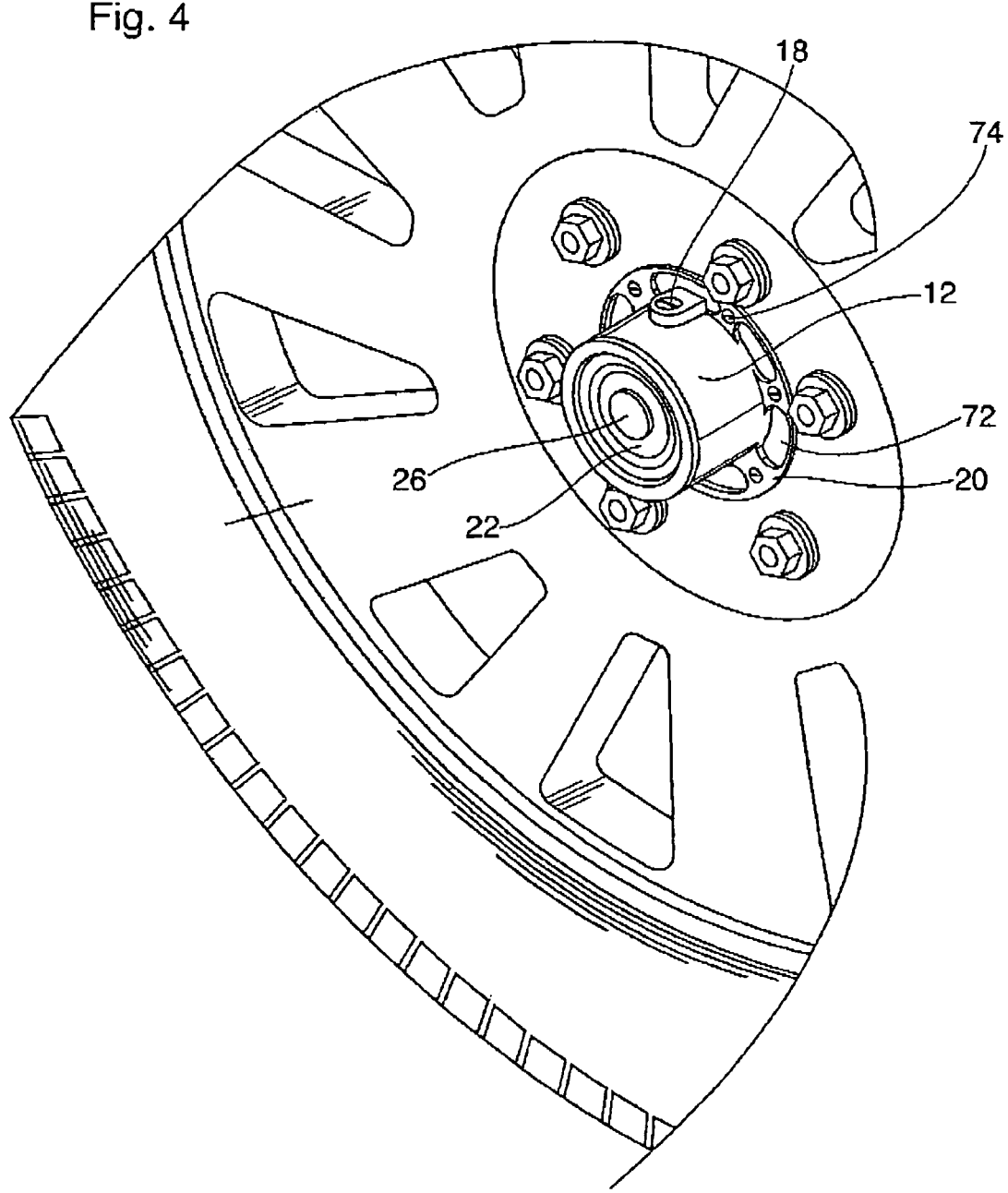
FIG. 4 is a perspective view of the oil hub cap of FIG. 1 mounted to a wheel.

As illustrated in FIG. 4, the oil hub cap 10 of the present invention is utilized for providing lubrication to a wheel axle to which it is attached. The oil hub cap 10 is assembled by placing the sealing gaskets 52 and 54 within the groove 50 of the ledge 46 encircling the inner wall of the cylindrical housing 12 and the groove 48 of the ledge 44 of the sealing ring 40. The annular shaped transparent window 22 is then placed in the proper position and the triangular cross section extension rings 60 and 62 are rolled or pressed into place to hold the transparent window 22 securely and sealed on the front face of the oil hub cap 10. The stopper 26 is then inserted through the aligned openings of the transparent window 22 and annular plate 34. The sealing portion 68 of the lower edge of the stopper 26 slides along the camming surface 64 of the sealing ring 40 until it passes the undercut 66 and then snaps into position to hold the stopper 26 in place.

The oil hub cap 10 is then placed on the wheel hub 72 utilizing a sealing gasket between the mounting flange 20 at the rear surface of the cylindrical housing 12 and the wheel-hub 72 and attached to the wheel hub 72 utilizing suitable fasteners 74. Lubricating fluid such as lubricating oil is added to the interior space 14 of the oil hub cap 10 by removing the stopper 18 and adding fluid until the fluid level reaches the inside edge 32 of the indicating ring 28. The stopper 18 is then replaced and the vehicle is ready for use.

During routine inspections of the vehicle, the level of lubricating fluid in the oil hub cap is easily determined by observing the fluid level in comparison to the inside and outside edges of the indicating ring. Owing to the reflective surface of the indicating ring, the difference in color of the surface of the ring covered by the fluid is easily determined. In low light situations such as would be encountered at night, a light is shone on the oil hub cap and the reflection of the light and the difference in color of the surface of the ring covered by fluid is easily determined.

The oil hub cap of the present invention allows for easy determination of the fluid levels within the oil hub cap under any conditions, particularly in low ambient light conditions. The provision of the indicating ring mounted within the interior space having a reflective surface with the inside edge indicating maximum fluid level and the outside edge indicating minimum fluid level provides for rapid and easy determination based upon the difference in color of the surface of the ring covered by the fluid. While not essential, in order to further aid in the determination of the level, the transparent window 22 may be provided with markings such as raised circles 76 which line up with the inside 32 and outside 30 edges of the indicating ring 28.

While preferred embodiments of the present invention have been described herein in detail, those of skill in the art will appreciate that variations may be made thereto without departing from the scope of the appended claims.

The embodiments of the invention in which an exclusive property or privilege is claimed are defined as follows:

1. An oil hub cap comprising a cylindrical body for mounting to a wheel axle defining an interior space for holding lubricant oil and a transparent front face, an indicating ring being located within the interior space, such that an outside edge of the indicating ring indicates a preferred minimum amount of lubricant to be contained within the interior space and an inside edge of the indicating ring indicates a preferred maximum amount of lubricant to be contained within the interior space, the surface of the indicating ring between the inside and outside edges being provided with a reflective surface.

2. The oil hub cap according to claim 1, wherein the indicating ring is mounted on an annular plate extending from the side of the cylindrical housing inwardly into the interior space, the annular plate between the side wall of the cylindrical housing and the indicating ring being provided with a number of openings to allow for the flow of the lubricating fluid from one side of the annular plate to the other within the interior space.

3. The oil hub cap according to claim 2, wherein the transparent front face is a transparent annular window having a central opening aligning with the central opening of the annular plate and a stopper is provided to seal the aligned central openings of the transparent annular window and annular plate.

4. The oil hub cap according to claim 3 wherein the annular plate is provided to the interior of the indicating ring with a sealing ring to provide for the seat for the transparent annular window and the stopper.

5. The oil huh cap according to claim 4 wherein the sealing ring comprises a side wall extending upwardly from the annular plate at an obtuse angle to a ledge in line with a ledge encircling an inner wall of the cylindrical housing to seat the transparent window thereon, each of the ledges being provided with a groove to allow for a sealing gasket to seal the lower surface of the transparent window, the inner edge of the sealing ring being provided with a camming surface sloping downwardly and inwardly to allow the stopper to be inserted into the opening and the sealing ring is provided with an undercut below the camming surface to provide a seating surface to engage the sealing portion of the lower edge of the stopper to seal the opening in the front face of the oil hub cap.

6. An oil hub cap comprising a cylindrical body for mounting to a wheel axle defining an interior space for holding lubricant oil and a transparent front face, an indicating ring being located within the interior space, such that an outside edge of the indicating ring indicates the minimum amount of lubricant to be contained within the interior space and an inside edge of the indicating ring indicates the maximum amount of lubricant to be contained within the interior space, the surface of the indicating ring between the inside and outside edges being provided with a reflective surface;
    said transparent front face is a transparent annular window having a central opening aligning with the central opening of the annular plate and a stopper is provided to seal the aligned central openings of the transparent annular window and annular plate;
    said indicating ring is mounted on an annular plate extending from the side of the cylindrical housing inwardly into the interior space, the annular plate between the side wall of the cylindrical housing and the indicating ring being provided with a number of openings to allow for the flow of the lubricating fluid from one side of the annular plate to the other within the interior space and said annular plate is provided to the interior of the indicating ring with a sealing ring to provide for the seat for the transparent annular window and the stopper; and
    wherein the sealing ring comprises a side wall extending upwardly from the annular plate at an obtuse angle to a ledge in line with a ledge encircling an inner wall of the cylindrical housing to seat the transparent window thereon, each of the ledges being provided with a groove to allow for a sealing gasket to seal the lower surface of the transparent window, the inner edge of the sealing ring being provided with a camming surface sloping downwardly and inwardly to allow the stopper to be inserted into the opening and the sealing ring is provided with an undercut below the camming surface to provide a seating surface to engage the sealing portion of the lower edge of the stopper to seal the opening in the front face of the oil hub cap.

\* \* \* \* \*